United States Patent
Iyer et al.

(10) Patent No.: US 7,797,356 B2
(45) Date of Patent: Sep. 14, 2010

(54) DYNAMICALLY DETECTING EXCEPTIONS BASED ON DATA CHANGES

(75) Inventors: Raman S. Iyer, Redmond, WA (US); C. James MacLennan, Redmond, WA (US); Ioan Bogdan Crivat, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 11/670,783

(22) Filed: Feb. 2, 2007

(65) Prior Publication Data

US 2008/0189639 A1    Aug. 7, 2008

(51) Int. Cl.
*G06F 7/00* (2006.01)
(52) U.S. Cl. ..................... 707/810; 707/625
(58) Field of Classification Search ............... 707/1–10, 707/104.1, 625, 810
See application file for complete search history.

(56) References Cited

U.S. PATENT DOCUMENTS

| | | | |
|---|---|---|---|
| 5,325,466 A | 6/1994 | Kornacker | |
| 5,367,619 A | 11/1994 | Dipaolo et al. | |
| 5,410,704 A | 4/1995 | Norden-Paul et al. | |
| 5,483,355 A | 1/1996 | Overton | |
| 6,189,010 B1 | 2/2001 | Isip, Jr. | |
| 6,192,379 B1 | 2/2001 | Bekenn | |
| 6,304,876 B1 | 10/2001 | Isip, Jr. | |
| 6,684,215 B1 | 1/2004 | Saracco | |
| 7,028,057 B1 | 4/2006 | Vasudevan et al. | |
| 7,426,059 B2 | 9/2008 | Broda | |
| 7,490,085 B2 | 2/2009 | Walker | |
| 2003/0055664 A1* | 3/2003 | Suri ............................. | 705/1 |
| 2004/0073534 A1* | 4/2004 | Robson ...................... | 707/1 |
| 2004/0083199 A1 | 4/2004 | Govindugari et al. | |
| 2004/0122706 A1 | 6/2004 | Walker | |
| 2004/0123101 A1 | 6/2004 | Rineer et al. | |
| 2004/0226002 A1 | 11/2004 | Larcheveque et al. | |
| 2005/0097072 A1 | 5/2005 | Brown et al. | |
| 2005/0198011 A1 | 9/2005 | Barsness et al. | |
| 2005/0228808 A1 | 10/2005 | Mamou | |
| 2005/0283837 A1* | 12/2005 | Olivier et al. ................ | 726/24 |
| 2006/0010112 A1 | 1/2006 | Crivat et al. | |
| 2006/0055945 A1 | 3/2006 | Fazakerly | |
| 2006/0059063 A1 | 3/2006 | LaComb | |

(Continued)

OTHER PUBLICATIONS

Improve Data Validation for More Accurate Results. SPSS. http://www.spss.com.sg/spss/Downloads/spss/14.0%20SPSS%20Data%20Validation.pdf. Last accessed Dec. 7, 2006.

(Continued)

*Primary Examiner*—Mohammad Ali
*Assistant Examiner*—John P Hocker
(74) *Attorney, Agent, or Firm*—Workman Nydegger

(57) ABSTRACT

Fields contained in data expressed as tabular data having columns and rows can initially be marked as exceptions, wherein a column within a row can be the potential cause of the exception. A user configurable parameter can be utilized to change the sensitivity or allowable exceptions for each row and/or column, to increase or decrease the number of exceptions detected. As data within each field are modified, added or deleted, or when the configurable parameter is changed, the exceptions marked can be automatically updated. Such updated exceptions can be the same or different from the initially marked exceptions. As such, a user can evaluate data and determine whether various changes within the data will change various outcomes.

17 Claims, 7 Drawing Sheets

U.S. PATENT DOCUMENTS

| | | |
|---|---|---|
| 2006/0100974 A1 | 5/2006 | Dieberger |
| 2006/0253205 A1 | 11/2006 | Gardiner |
| 2007/0112754 A1 | 5/2007 | Haigh |
| 2008/0189238 A1 | 8/2008 | Iyer |

OTHER PUBLICATIONS

Karolyn Duncan, et al. Rule Based Data Cleansing for Data Warehousing. http://www.dama-pdx.org/Cleasing.PDF. Last accessed Dec. 7, 2006.

Andreas Arning, et al. A Linear Method for Deviation Detection in Large Databases. http://www.almaden.ibm.com/software/projects/iis/hdb/Publications/papers/kdd96_dev.ps.gz. Last accessed Dec. 7, 2006.

Caroline Sporleder, et al. Spotting the 'Odd-one-out': Data-Driven Error Detection and Correction in Textual Databases. http://ilk.uvt.nl/~caroline/papers/atem06.pdf. Last accessed Dec. 7, 2006.

Peng Gong. Error detection through consistency checking. http://www.cnr.berkeley.edu/~gong/PDFpapers/GongMulanError.pdf. Last accessed Dec. 7, 2006.

Crivat et al., Detect Anomalies in Excel Spreadsheets., Advisor, Oct. 2004.

Campos et al., Data-Centric Automated Data Mining, Dec. 2005.

Tan et al., Introduction to Data Mining, Chapter 8, May 2005.

Office Action dated Apr. 22, 2009 cited in U.S. Appl. No. 11/670,735.

Tang, Z.H. and MacLennan, J.; Data Mining with SQL Server 2005. Chapters 1, 7, 16 & 17, John Wiley & Sons, Oct. 2005.

U.S. Appl. No. 11/670,735, filed Nov. 13, 2009, Office Action.

U.S. Appl. No. 11/670,735, filed Apr. 19, 2010, Notice of Allowance.

* cited by examiner

300

| COLUMN | # of Exceptions |
|---|---|
| Gender | 0 |
| Parent Income | 2 |
| IQ | 1 |
| Parent Encouragement | 2 |
| College Plans | 4 |

Exception Sensitivity 75 ◄—402

| COLUMN | OUTLIERS | |
|---|---|---|
| Gender | | 0 |
| ParentIncome | | 2 |
| IQ | | 1 |
| ParentEncouragement | | 2 |
| CollegePlans | | 4 |
| TOTAL | | 8 |

| 7 | Male | 33500 | 110 | Not Encouraged | Does not plan to attend |
|---|---|---|---|---|---|
| 8 | Male | 48100 | 102 | Not Encouraged | Plans to attend |
| 9 | Male | 33300 | 79 | Not Encouraged | Does not plan to attend |

| 7 | Male | 33500 | 110 | Not Encouraged | Does not plan to attend |
|---|---|---|---|---|---|
| 8 | Male | 48100 | 102 | Encouraged | Plans to attend |
| 9 | Male | 33300 | 79 | Not Encouraged | Does not plan to attend |
| 10 | Male | 80630 | 1020 | Encouraged | Plans to attend |

DYNAMICALLY DETECTING EXCEPTIONS BASED ON DATA CHANGES

BACKGROUND

Electronic storage mechanisms have enabled accumulation of massive amounts of data. For instance, data that previously required volumes of books for recordation can now be stored electronically without expense of printing paper and with a fraction of physical space needed for storage of paper. Many users employ database systems or other systems for storage and organization of data.

To maintain data in a readily retrievable and understandable manner, the data can be arranged in a tabular format or can be represented as if in a tabular format. That is to say, the tabular data can be organized in rows and columns, wherein each row can be regarded as an entity described by properties that are contained in the columns of the row. Exceptions, which are rows that do not conform to the rules or generalizations that govern the properties of most other rows, can be present within the tabular data. These exceptions can be diagnosed as errors in the data collection process and corrected accordingly. The exceptions may also be diagnosed as real problems and action can be taken to correct and/or make use of the exceptional data instance.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with automatic exception detection in tabular data based on data changes. The rows identified as exceptions and/or the column(s) most likely to generate the exceptions can be presented to a user in various formats, such as highlighting, changing a font type or style, or other manners that allow a user to readily perceive the exception row(s) and/or column(s). A user settable exception sensitivity parameter can define a threshold for marking a row as an exception. The user can modify the sensitivity parameter to increase or decrease the number of exceptions detected. At substantially the same time as the sensitivity parameter is changed and/or data is modified, added or deleted, the tabular data can be reevaluated and the relevant exceptions can be presented to the user, which may be the same or different exceptions than previously presented (e.g., exceptions presented before the data is modified or the sensitivity parameter changed).

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 3 illustrates an exemplary tabular dataset and its allowable exceptions.

FIG. 4 illustrates an exemplary exceptions report for the tabular dataset illustrated in FIG. 3

FIG. 5 illustrates exemplary exceptions based on original data contained in tabular data.

FIG. 6 illustrates exemplary exceptions changed on the fly as data is modified.

DETAILED DESCRIPTION

Figure 1:
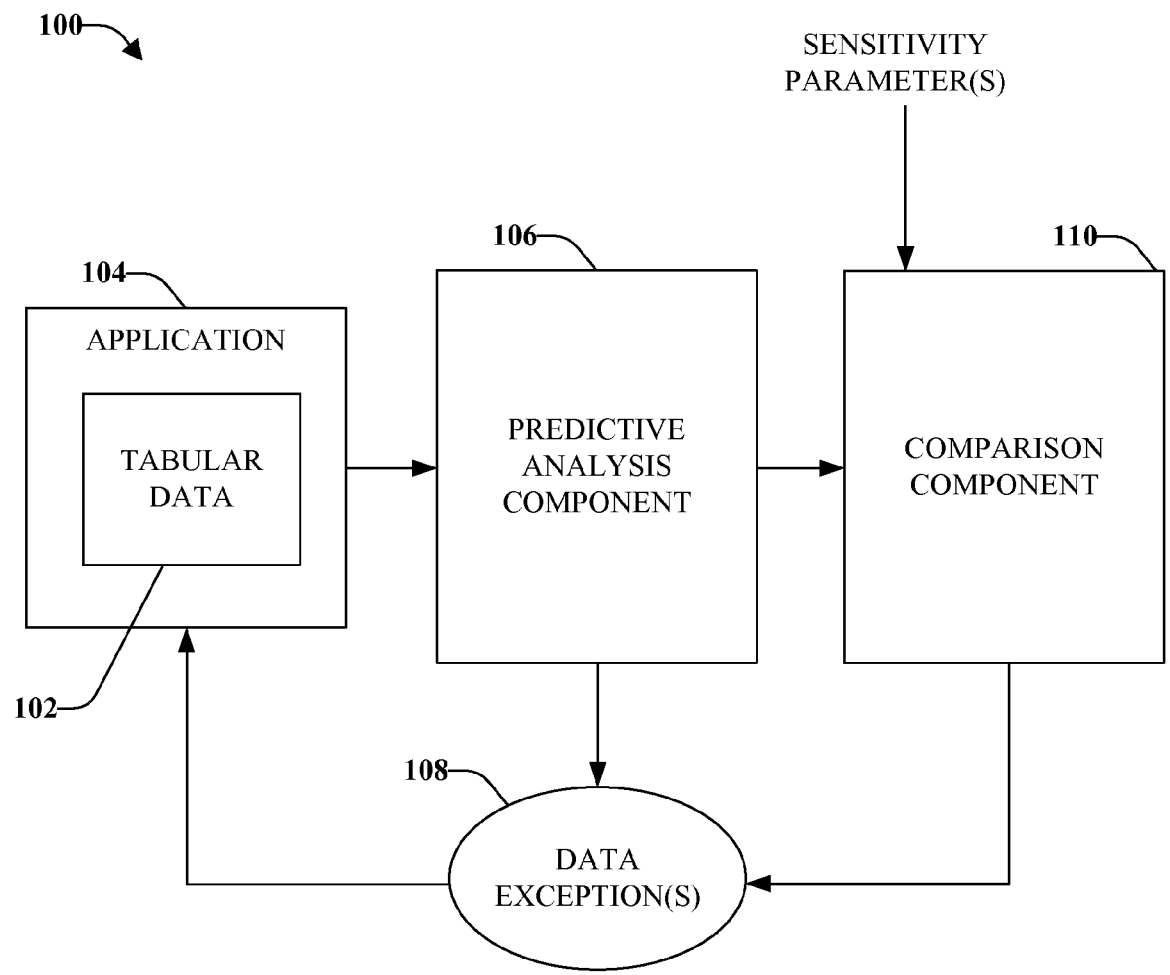
FIG. 1 illustrates a high-level block diagram of a system for dynamically detecting and presenting exceptions in tabular data.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

With reference now to the drawings, FIG. 1, illustrates a high-level block diagram of a system 100 for dynamically detecting and presenting exceptions in tabular data. System 100 can be configured to automatically detect exceptions inside tabular data as data is added, modified, deleted and/or when a user configurable threshold (e.g., sensitivity parameter) is changed. System 100 can further be configured to present information notifying a user of the row that is an exception and the column or columns within that row that are most likely the reason for considering the entire row an exception.

In further detail, system 100 includes tabular data 102, which can be any form of tabular data 102 from an application 104. The tabular data 102 can be in various forms, such as in a server in a relational form, in a storage media on a client application, or in numerous other forms. The tabular data 102 can be in a variety of formats, such as a spreadsheet, XML data that can be represented as tabular data, a grid based application, a form, a report, a table, a grid, a webpage, a printout, or other data that can be divided into fields. Thus, tabular data, as used herein, can be any data that is user visible and/or user interactive.

The tabular data information 102 can be provided to a predictive analysis component 106 that can be configured to analyze the tabular data 102 and infer which row or rows are exceptions inside that tabular data 102. The predictive analysis component 106 can output the inferred data exceptions 108, which can be displayed with the tabular data 102 and presented to a user. Predictive analysis component 106 can be configured to analyze an entire row and the combinations within those rows can be analyzed to infer the exception.

Predictive analysis component 106 can also communicate the data exceptions 108 can to a comparison component 110 that can be configured to analyze tabular data 102 at substantially the same time as there are modifications, deletions and/or additions to such data 102, which can be provided by a user and/or entity (e.g., the Internet, another system, a computer, . . . ), hereinafter referred to as user. Such analysis can result in the same or different data exceptions 108, which can be presented to a user. Comparison component 110 can further be configured to receive changes to a user configurable sensitivity parameter and present the data exceptions 108 to the user based in part on the sensitivity parameter. Thus, exceptions are detected and indicated in a real-time manner as the user edits, adds or deletes data.

Thus, as the user is presented with the exceptions, the user might start questioning the data. For example, there might be over thirty different measurements for breast cancer tumors that facilitate diagnosis of whether a tumor is malignant or benign. Utilizing the disclosed techniques might indicate one row, and in particular a column within that row, by which all the measurements make the tumor appear, during diagnosis, as a benign tumor when in reality it is a malignant tumor. Thus, with a simple click or input from the user, this row/column can be found quickly. Although the fact that the tumors are malignant cannot change, the data can be questioned to ask why this one malignant tumor looks benign when the other (benign) tumors appear similar to this one. Thus, both diagnosis and data integrity can be improved, resulting in earlier treatment measures.

Figure 2:
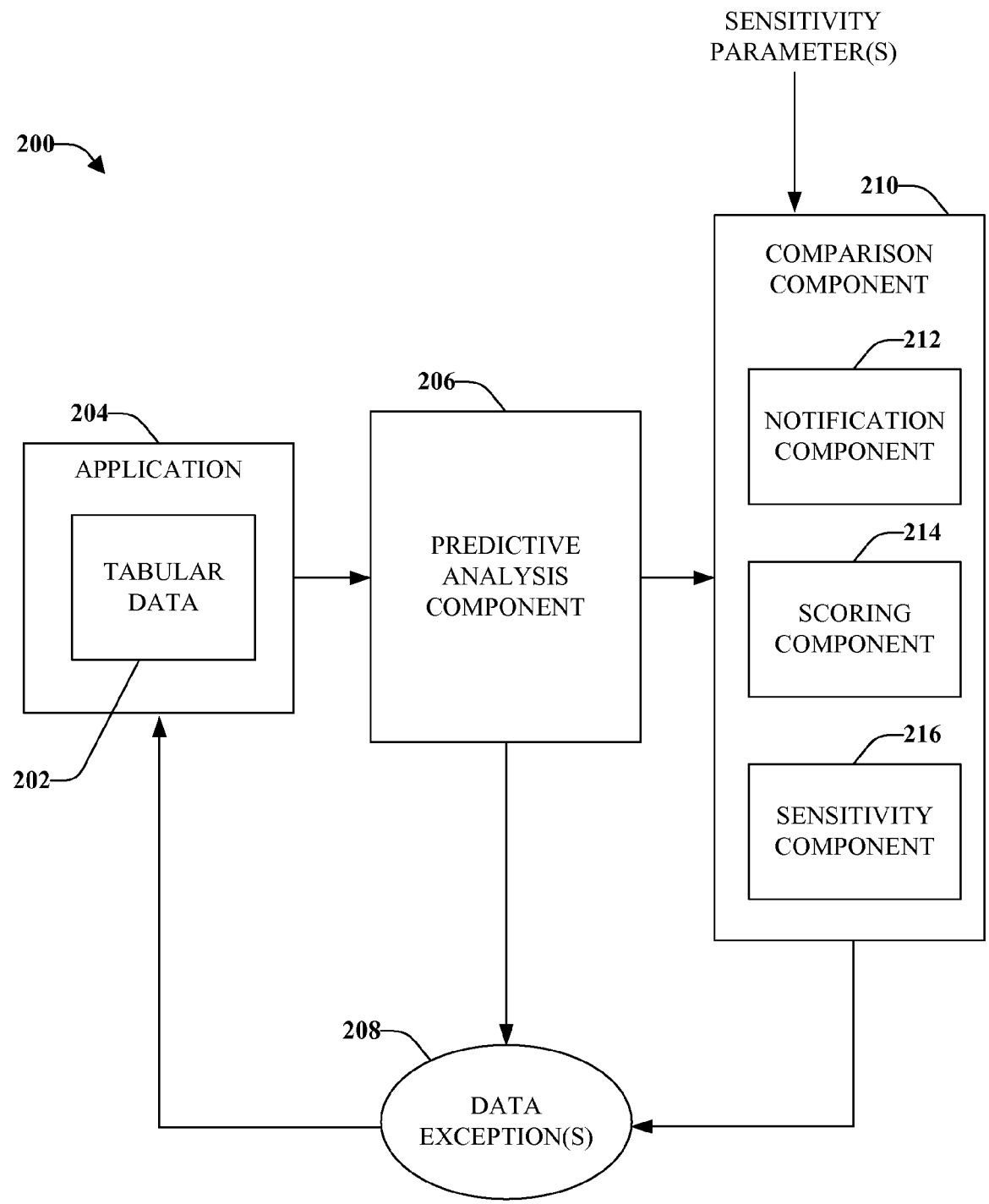
FIG. 2 illustrates a block-diagram of a system for continuous data exception detection.

FIG. 2 illustrates a block-diagram of a system 200 for continuous data exception detection. As base fields or values within tabular data is modified (e.g., changed, added, deleted), system 200 can automatically reevaluate rows and columns (e.g., cells, fields) and infer whether a row or rows are exceptions and the column or columns within such rows that are the potential cause of making the row(s) an exception.

System 200 includes tabular data 202 (e.g., data expressed as, or that can be represented as, rows and columns) within an application 204. The tabular data 202 can be uploaded to a predictive analysis component 206 as a row set parameter. Predictive analysis component 206 can build a model for detecting exceptions by detecting one or more clusters within the row set parameters. Rows that do not belong to a cluster can be considered exceptions based on the distance between the center of a cluster and the row not belonging to a cluster. The row with the farthest distance may be considered the exception, although other manners of declaring a row an exception can be utilized.

The data exceptions 208 can be presented to a user and/or communicated to a comparison component 210 that can be configured to dynamically update the data exception 208 information with different data exceptions 208, if need. For example, if the tabular data changes (e.g., modified, added, deleted) rendering different rows and/or columns as the exceptions or if there are changes to a configurable sensitivity parameter, the row(s) and/or column(s) that are exceptions may change based on the changed data or the changed parameter. This information can be presented to the user automatically as the information changes.

Comparison component 210 can include a notification component 212 that can be configured to receive a notification or alert when tabular data 202 changes. As such, the notification component 212 can receive this information directly from the application 204 or from the predictive analysis component 206, as illustrated. The notification component 212 can invoke the comparison component when a change occurs.

Also included is a scoring component 214 that can be configured to utilize a query or other means to assign a score to the changed data row. In other words, all the data entered into a tabular database can be grouped by rows and a model of the world is rendered, which is the world as seen through the data. When a new row is added, a determination can be made whether the new row fits into the modeled world and where that row falls within the other rows. The various columns included in each row can have any number of exceptions, which can be established by a sensitivity parameter. In some embodiments, data mining techniques are employed to highlight exceptions on the fly.

A sensitivity component 216 can be configured to apply a sensitivity parameter (e.g., threshold, metric, value and so on) to the exception data. The exception sensitivity parameter can define the threshold for marking a row as an exception. This metric can be automatically applied by system 200, such as a default metric, such as 75. The metric can also be selected by a user, such as through an interface component or in a control panel tool or other tool, which allows changes to the exception sensitivity on the fly, or as desired. By way of example and not limitation, a high measurement (e.g., 100) can represent no exceptions and a low metric (e.g., 0) can represent everything as an exception. In some embodiments, the low metric can represent no exceptions while the high metric represents all exceptions. In other words, the metric is defined for measuring a distance between any given row and a "typical row" (as determined by predictive analysis component 206). However, it should be understood that most or all rows will be more or less different from the "typical row" and the "typical row" is simply a loose standard.

A row, deemed an exception, can be marked in order to be readily perceivable by a user, such as by highlighting the row or through another manner. In addition, the column within that row that is most likely the column that generated the exception can be marked, such as with a different color highlight or through another means, provided the user can readily perceive the marked column.

The user can take various actions based on the presented information relating to the row and columns considered exceptions. For example, the exception can be diagnosed as an error in the data collection process, the data entry process, or another problem associated with gathering and/or compiling the data. For such errors, the tabular data can be corrected as appropriate. The exceptions can also be diagnosed as real problems and action can be taken to correct and/or utilize the exceptional data instance. Thus, in accordance with the disclosed embodiments, an exception handling process can benefit when the exceptions are provided and at substantially the same time an explanation of the potential cause of the exception can be provided.

In some embodiments, system 200 can be employed on two or more machines. That is to say, the disclosed computations, modeling and predictive analytics can be executed on a server independent of the location of the data. For example, the data 202 can be retained in a client machine and the predictive analysis component 206 and/or comparison component 210 can be located on another machine, such as a remote server. Therefore, a device with low computing power can interact with a server machine, which can perform the computational complexities described herein. The interaction can be through various connections, both wired and wireless.

FIG. 3 illustrates an exemplary tabular dataset 300 and its allowable exceptions. An exception sensitivity parameter can be a numeric value. Interpreting this value can include an intuitive manner of evaluating the parameter value. An exception is a row that does not conform to the patterns that govern most other rows. The column that is most likely the cause for marking a row as an exception can be determined, allowing each exception row to be described by a column (e.g., the column that makes the row an exception). For any given value of the exception sensitivity parameter, a number of exceptions can be detected in the data set. Each such exception can be caused by a column. Thus, the value of exception sensitivity can be described intuitively by the number of exceptions in every column.

The exemplary tabular dataset 300 contains the following columns 302: Gender, Parent Income, IQ, Parent Encouragement, College Plans. An exemption sensitivity value of 0.75, for example, can provide a varying number of exceptions 304 allowable for each column 302. Thus, there can be zero exceptions for the Gender column, two exceptions for the Parent Income, one exception for the IQ column, two exceptions for the Parent Encouragement column, and four exceptions for the College Plans column. As the value of the exception sensitivity approaches closer to zero, the number of exceptions in each column 302 can become larger (or vice versa). For example, the number of exceptions for the College Plans column can increase to ten. The value of the exception sensitivity parameter can be visually and intuitively correlated with an actual number of exceptions in the data set. In some embodiment, such numbers can be presented to the user to allow the user to achieve the desired results.

FIG. 4 illustrates an exemplary exceptions report 400 for the tabular dataset illustrated in FIG. 3. Detecting and highlighting (or otherwise marking) exceptions can be launched by a user interface 402 that can be added within a viewing area of the tabular data (e.g., spreadsheet application, and so forth). The user interface 402 can allow the Exception Sensitivity to be changed, such as by clicking or selecting the "up arrow" or "down arrow" next to the sensitivity number. Alternatively or additionally, the Exception Sensitivity can be changed by direct entry of the number, such as with a keypad, or through other manners. The sensitivity number or parameter can initially be a default value or a customer definable value. The parameter "75" is illustrated for example purposes only and can be heuristically detected as the best for most applications, although other parameters can be the default parameter. The parameter can be any value between zero and one hundred, wherein zero can indicate maximum sensitivity (e.g., almost everything is an exception) and one hundred can indicate minimum sensitivity (e.g., only the most eccentric rows are marked as exceptions).

As the configurable setting or dynamic threshold control is changed, the exceptions within the tabular data automatically show or disappear. For example, if the threshold is increased, the exceptions might disappear and if the threshold is decreased, more exceptions might appear. This parameter can be a number or value rather than a percentage. If a threshold of 75 provided no exceptions, a lower threshold might be used to display more exceptions. If too many exceptions are displayed and the user cannot accurately determine what are the exceptions, the threshold can be raised in order to display fewer exceptions. It should be noted that the scale can be reversed or other scales can be utilized with the disclosed embodiments.

The impact of the Exception Sensitivity parameter over the source data can change as indicated by the outliers 404 or exceptions. As compared to FIG. 3, above, the Gender column can have zero exceptions, the Parent Income Column can have two exceptions, the IQ column can have one exception, the Parent Encouragement column can have two exceptions and the College Plans column can have four exceptions, due to a parameter change. A bar or other illustrative means of readily perceiving the number of exceptions can be provided, a few of which are referenced at 406 and 408. The spreadsheet can also be considered an execution report that summarizes the exception detection process and a control panel (e.g., user interface 402) that allows changes to the Exception Sensitivity parameter.

FIG. 5 illustrates exemplary exceptions 500 based on original data contained in tabular data. A sampling of a spreadsheet, which is an example of tabular data that can utilize the disclosed embodiments, is illustrated. Only columns 7, 8 and 9 are illustrated for purposes of simplicity.

A highlighting scheme can be utilized such that a row determined to be an exception can be highlighted, as illustrated by line 8, and a different colored highlight (indicated by cell 502) can be utilized to indicate a column that is the potential trigger or cause of the exceptions. It should be noted that other means for allowing the user to perceive the exception row can be utilized instead of (or in addition to) highlighting.

Changes in the value of an Exception Sensitivity parameter can be reflected at substantially the same time in the spreadsheet data. In other words, more or less rows can be highlighted, based on the parameter value. Also, the number of exceptions for each column (listed under the value of the Exception Sensitivity) can be updated at substantially the same time as the value of the parameter is changed.

In the spreadsheet 500, changes in the data can result in automatic re-evaluation of the rows. These re-evaluations can result in the row being marked as an exception or being un-marked (e.g., not an exception). FIG. 6 illustrates exemplary exceptions changed on the fly as data is modified. For example, if row 8 is changed from "Not Encouraged" to "Encouraged" the row might no longer be an exception and the highlighting (or other indicator) disappears, as illustrated (e.g., no shading). Another column and/or row might be highlighted if the change renders another row/column the exception.

In accordance with some embodiments, conditional formatting can be utilized to display exceptions. The user can provide a condition, and based on this condition, system can automatically format a cell or a value based on the user applied condition. Such conditional formatting can include identifying a particular cell and indicating that if the value of that cell is above a certain number it should be marked in "green" and if it is below that same number it should be marked in "red".

Figure 7:
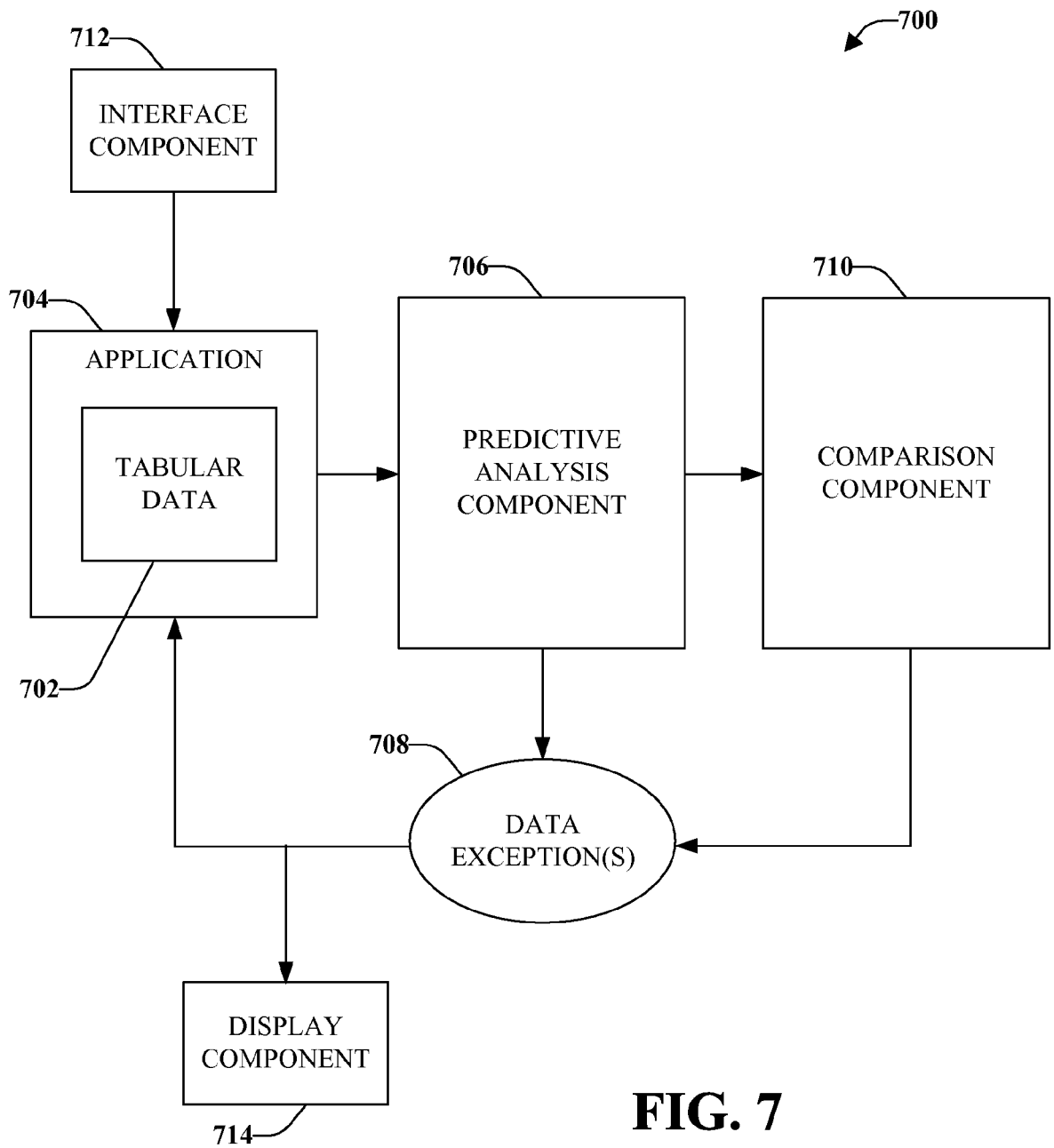
FIG. 7 illustrates a system for continuous and automatic exception detection within rows and columns of tabular data.

FIG. 7 illustrates a system 700 for continuous and automatic exception detection within rows and columns of tabular data. System 700 is similar to the systems shown and described with reference to the above figures. Included is tabular data 702 within an application 704 and a predictive analysis component 706 configured to build a model that describes patterns in the tabular data 702 and to detect and mark (e.g., highlight) exceptions 708 on the fly.

A comparison component 710 can be configured to employ an application-specific notification system to detect changes (e.g., modifications, additions, deletion, and so forth) to the data contained in the field (e.g., rows, columns). A query (or other application) can be executed by comparison component 710 to assign a score to the data row at substantially the same time as the data row is being changed. This score can be compared with an exception sensitivity parameter, which is a parameter that defines a threshold for marking the row as an exception.

A user can selectively set the exception sensitivity parameter, through an interface component 712. In some embodiments, the user can change the data fields through the interface component 712. The interface component 712 can provide various types of user interfaces. For example, the interface component 712 can provide a graphical user interface (GUI), a command line interface, a speech interface, Natural Language text interface, and the like. For example, a GUI can be rendered that provides a user with a region or means to load, import, select, read, etc. tabular data. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The exception row and its potential cause (e.g., one or more columns) can be presented to the user, such as through display component 714, which can be a graphical user interface or other interfaces. The information can be presented through various techniques such as highlighting the exception row and/or column(s), changing the font, font style, font size, font color, underline, and so forth.

Figure 8:
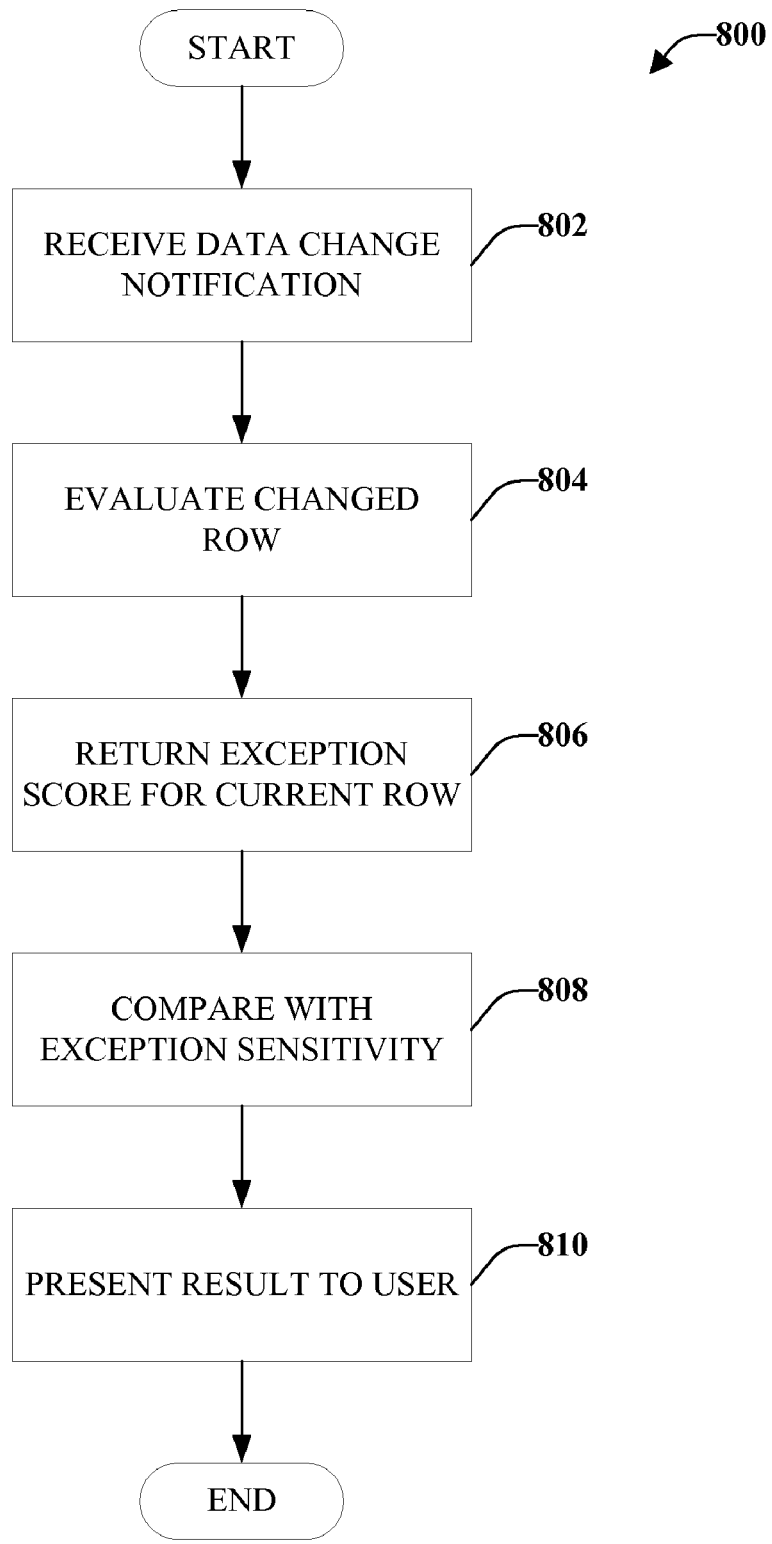
FIG. 8 illustrates a method for dynamically detecting exceptions based on data changes.

In view of the exemplary systems shown and described above, a method that may be implemented in accordance with the disclosed subject matter, will be better appreciated with reference to the flow chart of FIG. 8. While, for purposes of simplicity of explanation, the method is shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the disclosed embodiments. It is to be appreciated that the functionality associated with the blocks may be implemented by software, hardware, a combination thereof or any other suitable means (e.g. device, system, process, component). Additionally, it should be further appreciated that the disclosed embodiments are capable of being stored on an article of manufacture to facilitate transporting and transferring such methodologies to various devices. Those skilled in the art will understand and appreciate that a method could alternatively be represented as a series of interrelated states or events, such as in a state diagram.

FIG. 8 illustrates a method 800 for dynamically detecting exceptions based on data changes. Method 800 starts, at 802, when a data change notification relating to tabular data within an application is received. The notification can be received at substantially the same time as fields (e.g., columns, rows, cells, and so on) within the tabular data are modified, added, deleted, and so forth. This information can be input in combination with data that has been analyzed or is being analyzed at substantially the same time as the fields are modified. The notification can also relate to an exception sensitivity parameter whereby a sensitivity value has a low value and a high value. The low value can result in less exceptions being found in the tabular data and the high value can represent more exceptions being found in the tabular data. However, these are merely examples and other means of identifying exception sensitivity can be utilized with the disclosed techniques.

At 804, a changed row is evaluated, such as by utilizing a data mining system that contains a pattern model. Data mining system can utilize data mining technology, which involves searching through large amounts of data to uncover patterns and relationships contained therein. In the data-mining world, there are at least two operations that are performed with data. These operations are training (finding patterns in data) and prediction (applying such patterns to infer new/ missing knowledge about data). For example, data mining can be used to explore large detailed business transactions, such as credit card transactions, to determine the most influential factors common to non-profitable customers.

An exception score for the changed row can be returned, at 806, and combined with the previously analyzed data and compared with an exception sensitivity parameter, at 808, where data exceptions can be inferred from all the data received. It is to be understood that this can be continuous such that the method 800 returns to 802 when additional changes are made to the tabular data. As such, the exception data is continuously updated. The results can be presented to the user, at 810.

Figure 9:
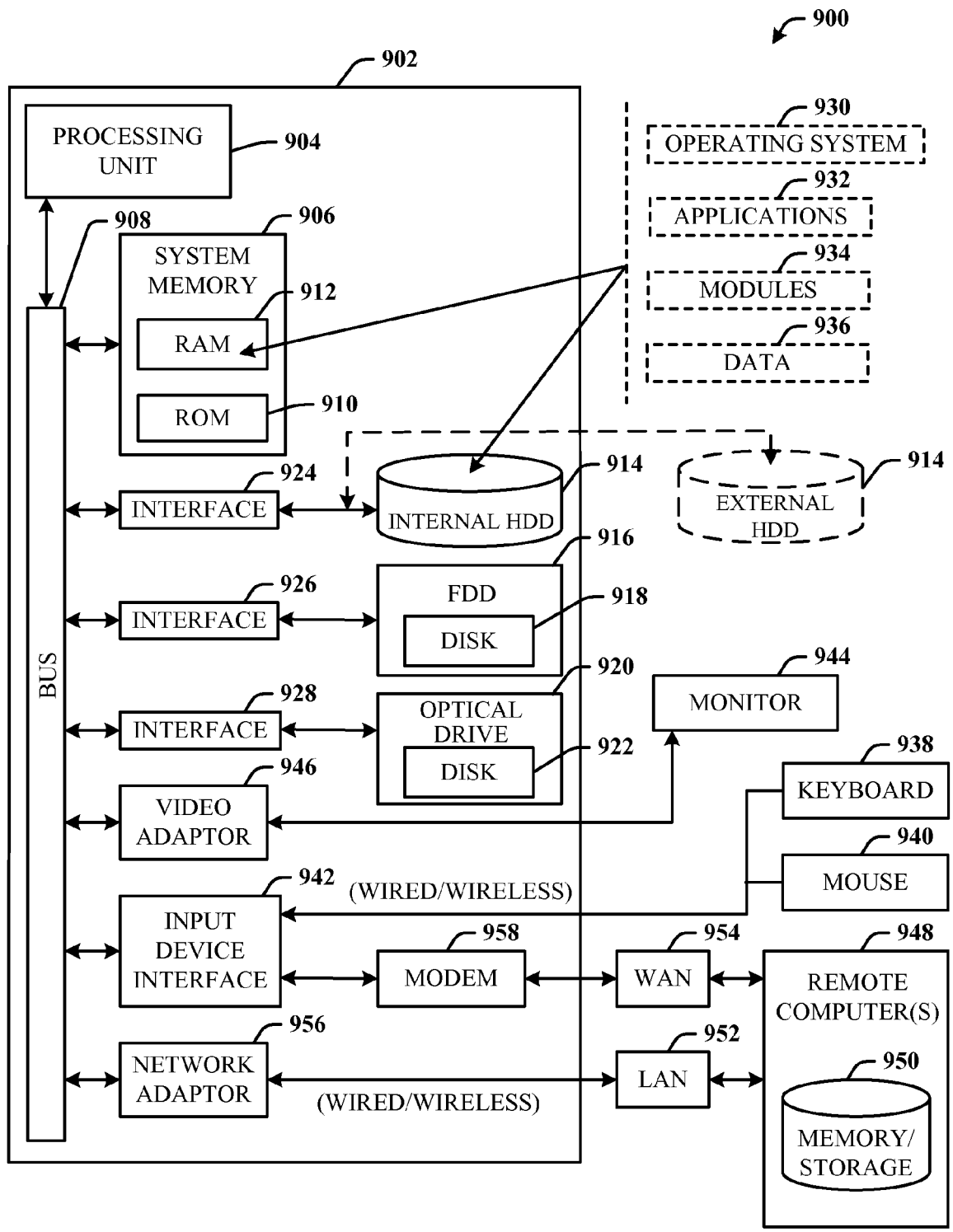
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
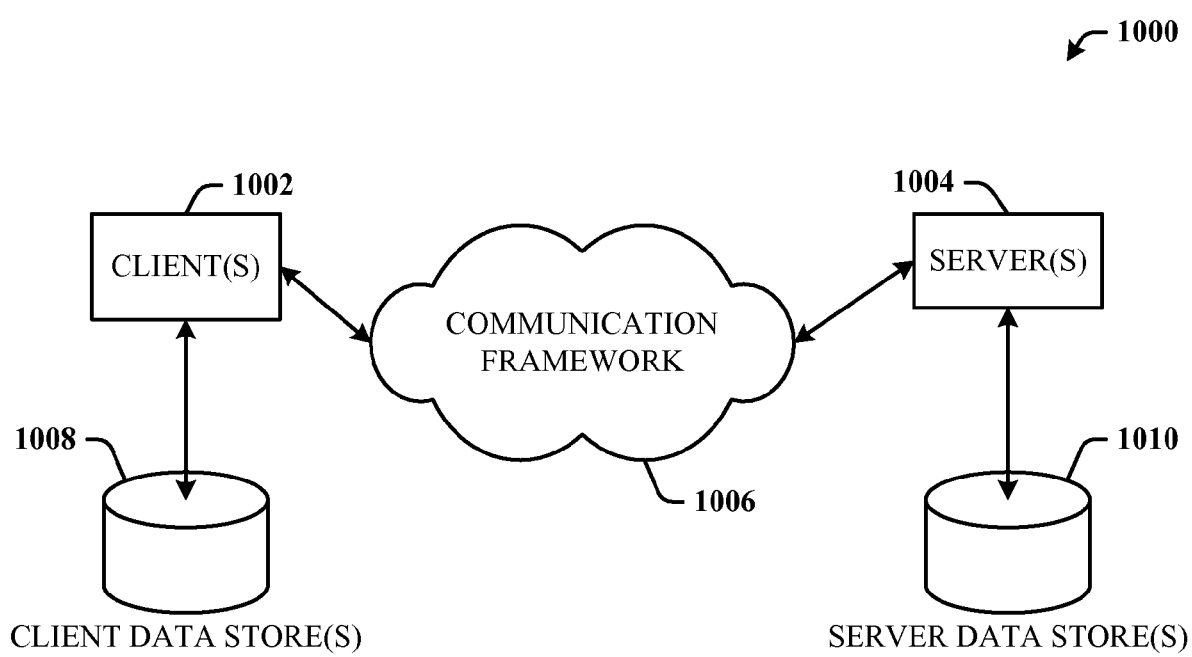
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more client(s) 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more server(s) 1004. The server(s) 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client (s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

What is claimed is:

1. A computing system that facilitates dynamically detecting data exceptions in tabular data, comprising:
    (A) one or more computer processors and one or more computer-readable media;
    (B) a predictive analysis component, executable upon the one or more computer processors, the predictive analysis component comprising:
        (i) receiving tabular data from an application,
        (ii) building a model for detecting exceptions within the tabular data by detecting one or more clusters,
        (iii) determining one or more rows that are exceptions by determining a distance between the one or more rows and the one or more clusters, and
        (iv) marking the one or more rows that are exceptions within the tabular data;
    (C) an interface component that provides a user configurable parameter that defines a threshold for making the one or more rows as an exception
    (D) a comparison component that receives changes to one or more parameters of the tabular data and automatically evaluates the one or more parameters against the one or more marked rows and selectively updates the one or more marked rows;
    (E) a sensitivity value that has a low value and a high value, the low value results in less exceptions being marked in the tabular data and the high value represents more exceptions being marked in the tabular data; and
    (F) a notification component that automatically invokes the comparison component when a data change occurs.

2. The system of claim 1, further comprising an interface component that provides a user configurable parameter that defines a threshold for marking the one or more rows as an exception.

3. The system of claim 1, the one or more parameters is at least one of a data modification, a data addition, a data deletion, or a sensitivity parameter change or combinations thereof.

4. The system of claim 1, wherein the comparison component utilizes conditional formatting to update the one or more rows that are displayed.

5. The system of claim 1 further comprising a display component that presents the tabular data and the one or more marked rows.

6. The system of claim 1, wherein the predictive analysis component and the comparison component are executed on a server independent of the location of the tabular data.

7. The system of claim 1, further comprising a scoring component that utilizes data mining techniques to update the one or more marked rows.

8. The system of claim 1, wherein the one or more rows are marked by a highlighting scheme.

9. The system of claim 1, wherein the tabular data is contained in a spreadsheet application.

10. The system of claim 1, wherein the tabular data is contained in an XML application.

11. A computerized method for dynamically detecting and presenting exception data, the method performed within a computing environment, comprising:
    (A) at least one computer processor and at least one computer-readable media
    (B) a predictive analysis component, executable upon the one or more computer processors, the predictive analysis component comprising:
        (i) receiving tabular data from an application,
        (ii) building a model for detecting exceptions within the tabular data by detecting one or more clusters,
        (iii) determining one or more rows that are exceptions by determining a distance between the one or more rows and the one or more clusters, and
        (iv) marking the one or more rows that are exceptions within the tabular data;
    (C) an interface component that provides a user configurable parameter that defines a threshold for making the one or more rows as an exception
    (D) a comparison component that receives changes to one or more parameters of the tabular data and automatically evaluates the one or more parameters against the one or more marked rows and selectively updates the one or more marked rows;
    (E) maintaining a sensitivity value that has a low value and a high value, the low value results in less exceptions being marked in the tabular data and the high value represents more exceptions being marked in the tabular data; and
    (F) a notification component that automatically invokes the comparison component when a data change occurs.

12. The method of claim 11, further comprising comparing an exception score with a sensitivity metric and providing a configurable set point.

13. The method of claim 11, wherein presenting the exception result to a user, comprises highlighting a row and a column within the row with a highlighting scheme.

14. The method of claim 11, further comprising utilizing a data mining system that contains a pattern model.

15. The method of claim 11, wherein presenting the exception result to a user is on the fly as data change notifications are received.

16. The method of claim 11, further comprising accepting a user change to at least one of a data modification, a data addition, a data deletion or a sensitivity metric parameter, or combinations thereof.

17. A computer program product comprising:
    (A) at least one computer-readable media having computer-executable instructions encoded thereon which, when executed upon one or more computer processors, performs a method comprising:
        (i) receiving tabular data from an application,
        (ii) building a model for detecting exceptions within the tabular data by detecting one or more clusters, (iii) determining one or more rows that are exceptions by determining a distance between the one or more rows and the one or more clusters, and
(iv) marking the one or more rows that are exceptions within the tabular data;
(v) providing a user configurable parameter that defines a threshold for marking the one or more rows as an exception;
(vi) a comparison component receiving changes to one or more parameters of the tabular data and automatically evaluating the one or more parameters against the one or more marked rows and selectively updating the one or more marked rows;
(vii) maintaining a sensitivity value that has a low value and a high value, the low value resulting in less exceptions being marked in the tabular data and the high value representing more exceptions being marked in the tabular data;
(viii) automatically invoking the comparison component when a data change occurs; and
(ix) presenting an exception result to a user.

* * * * *